US010719007B2

(12) United States Patent
Aikoh

(10) Patent No.: US 10,719,007 B2
(45) Date of Patent: Jul. 21, 2020

(54) COMPOSITE-OPTICAL-SYSTEM UNIT AND PROJECTOR

(71) Applicant: SONY CORPORATION, Tokyo (JP)

(72) Inventor: Yoshihisa Aikoh, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/314,991

(22) PCT Filed: Jun. 8, 2017

(86) PCT No.: PCT/JP2017/021327
§ 371 (c)(1),
(2) Date: Jan. 3, 2019

(87) PCT Pub. No.: WO2018/020850
PCT Pub. Date: Feb. 1, 2018

(65) Prior Publication Data
US 2019/0243231 A1 Aug. 8, 2019

(30) Foreign Application Priority Data
Jul. 29, 2016 (JP) .................... 2016-149696

(51) Int. Cl.
*G03B 33/12* (2006.01)
*G02B 27/28* (2006.01)
(Continued)

(52) U.S. Cl.
CPC ............ *G03B 33/12* (2013.01); *G02B 7/008* (2013.01); *G02B 7/1815* (2013.01);
(Continued)

(58) Field of Classification Search
CPC ...... G03B 33/12; G03B 21/16; G02B 7/1815; G02B 27/285
(Continued)

(56) References Cited
U.S. PATENT DOCUMENTS

| 2003/0081180 A1* | 5/2003 | Suzuki | H04N 9/3105 353/31 |
| 2003/0151833 A1* | 8/2003 | Berman | G02B 27/283 359/831 |
| 2009/0179827 A1 | 7/2009 | Oakley | |

FOREIGN PATENT DOCUMENTS

| JP | 10-307209 A | 11/1998 |
| JP | 2004-20621 A | 1/2004 |

(Continued)

OTHER PUBLICATIONS

Derwent: KR 2010005428; Priority Jan. 2010; Korea; Jeong J (Year: 2010).*

(Continued)

*Primary Examiner* — Jerry L Brooks
(74) *Attorney, Agent, or Firm* — Oblon, McClelland, Maier & Neustadt, L.L.P.

(57) ABSTRACT

[Solving Means] A composite-optical-system unit includes a polarization beam splitter and a thermal conduction member. The polarization beam splitter includes a first prism including a first surface, a second prism including a second surface having an area different from an area of the first surface, and an overlap interface on which the first surface is attached to and overlaps the second surface. The thermal conduction member is thermally connected to a connection region being a region other than the overlap interface of the first surface or the second surface having an area larger than an area of the other surface.

9 Claims, 7 Drawing Sheets

(51) Int. Cl.
    *G03B 21/16*     (2006.01)
    *G02B 27/14*     (2006.01)
    *G02B 7/00*      (2006.01)
    *G03B 21/00*     (2006.01)
    *G03B 21/14*     (2006.01)
    *G02B 27/10*     (2006.01)
    *G02B 7/18*      (2006.01)

(52) U.S. Cl.
    CPC ......... *G02B 27/102* (2013.01); *G02B 27/141* (2013.01); *G02B 27/283* (2013.01); *G02B 27/285* (2013.01); *G03B 21/00* (2013.01); *G03B 21/14* (2013.01); *G03B 21/16* (2013.01)

(58) Field of Classification Search
    USPC .......................................................... 353/33
    See application file for complete search history.

(56) References Cited

FOREIGN PATENT DOCUMENTS

| | | |
|---|---|---|
| JP | 2004-309941 A | 11/2004 |
| JP | 2010-85676 A | 4/2010 |
| JP | 2012-123194 A | 6/2012 |

OTHER PUBLICATIONS

International Search Report dated Sep. 12, 2017, in PCT/JP2017/021327, filed Jun. 8, 2017.

\* cited by examiner

COMPOSITE-OPTICAL-SYSTEM UNIT AND PROJECTOR

TECHNICAL FIELD

The present technology relates to a composite-optical-system unit and a projector including the composite-optical-system unit.

BACKGROUND ART

A light source device described in Patent Literature 1 includes three prism-type polarization beam splitters that generate luminous flux having three wavelength regions of red, green, and blue, guide the luminous flux to a reflective-type liquid-crystal panel, obtain image lights having the three wavelength regions respectively, composite the image lights, and output the image lights. For example, considering an accuracy of an arrangement of prisms in a manufacturing process, each of the polarization beam splitters is structured by a combination of the prisms having different heights (For example, see paragraphs [0026] and [0028] of the specification, and FIGS. 6 and 7 of Patent Literature 1.).

A polarization beam splitter described in Patent Literature 2 is structured in order that each attached surface of two right-angle prisms has a different area from each other. According to the structure, a part of the attached surface of the one right-angle prism functions as a reference plane when the polarization beam splitter is attached to an attachment member (For example, see paragraph [0015] of the specification and FIG. 1 of Patent Literature 2.).

CITATION LIST

Patent Literature

Patent Literature 1: Japanese Patent Application Laid-open No. 2004-20621
Patent Literature 2: Japanese Patent Application Laid-open No. H10-307209

DISCLOSURE OF INVENTION

Technical Problem

In recent years, it is desirable for a projector to have higher brightness. Thus, in a case that a large amount of light is output from a light source, depending on an amount of light received by a polarization-separation film of a polarization beam splitter, a temperature may rise or a temperature distribution having a sharp gradient in one prism piece may be produced. As a result, a prism may be damaged.

It is an object of the present disclosure to provide a composite-optical-system unit capable of suppressing production of a sharp temperature gradient of the polarization beam splitter or rise of a temperature of the polarization beam splitter, and a projector including the composite-optical-system unit.

Solution to Problem

In order to attain the object, a composite-optical-system unit according to the present technology includes a polarization beam splitter and a thermal conduction member.

The polarization beam splitter includes a first prism including a first surface, a second prism including a second surface having an area different from an area of the first surface, and an overlap interface on which the first surface is attached to and overlaps the second surface.

The thermal conduction member is thermally connected to a connection region being a region other than the overlap interface of the first surface or the second surface having an area larger than an area of the other surface.

In a case that a light is irradiated to the first surface and the second surface, making the first surface and the second surface uniform is promoted via the thermal conduction member thermally connected to the connection region. Thus, the composite-optical-system unit may suppress production of a sharp temperature gradient of the polarization beam splitter or rise of a temperature of the polarization beam splitter.

The composite-optical-system unit may further include a heat source that supplies heat to the polarization beam splitter via the thermal conduction member.

The thermal conduction member may further include a heater that supplies heat to the polarization beam splitter.

By providing the heater, making the heat of the first surface and the second surface uniform may be realized.

The first prism and the second prism may be attached to each other in order that the connection region is provided in at least a part of a region around the overlap interface.

Due to this, diffusing heat from a center of the first surface or the second surface at which the light is converged to a region surrounding the center, or from the region surrounding the center to the center may be promoted.

The connection region may be provided on both ends of the first surface or the second surface to be on either end of the overlap interface.

The connection region may be provided on an entire region surrounding the overlap interface.

The thermal conduction member may be a heat sink, a part of a heat transport device, or a thermoelectric element.

The devices are applied for absorbing heat from the first surface and the second surface via the connection region (in other words, for cooling) or for supplying heat to the connection region (in other words, for heating).

The plurality of polarization beam splitters may be provided, and each of the plurality of polarization beam splitters may include an incident-side surface that a light enters and an emission-side surface from which a light is emitted.

The composite-optical-system unit may include a pair of spacer plates and an optical element, each of the pair of spacer plates including a first contact surface and a second contact surface provided on a side opposite to the first contact surface.

Each of the pair of spacer plates is arranged between a first polarization beam splitter and a second polarization beam splitter of the plurality of polarization beam splitters in order that the first contact surface is fixed on the emission-side surface of the first polarization beam splitter by on-plane contact, and the second contact surface is fixed on the incident-side surface of the second polarization beam splitter by on-plane contact.

The optical element is arranged between the pair of spacer plates.

The spacer plates that are structured in a plate shape make a pair, and are arranged in order that the first polarization beam splitter and the second polarization beam splitter contact with the contact surfaces of the spacer plates by on-plane contact. As a result, a stiffness of the composite-optical-system unit may be increased. Due to this, relative position accuracy of the polarization beam splitters may be maintained accurately.

A projector according to an embodiment includes a light source unit, a separation optical system, an image generation element, and the composite-optical-system unit.

The separation-optical-system unit separates a light emitted from the light source unit into lights having different wavelength regions.

The image generation element generates image lights using the lights having the different wavelength regions respectively.

Advantageous Effects of Invention

As described above, according to the present technology, it is possible to suppress production of a sharp temperature gradient of a polarization beam splitter or rise of a temperature of the polarization beam splitter.

Note that the effects described above are not limitative, but any effect described in the present disclosure may be produced.

MODE(S) FOR CARRYING OUT THE INVENTION

Hereinafter, embodiments according to the present technology will be described with reference to the drawings.

1. Projector

Figure 1:
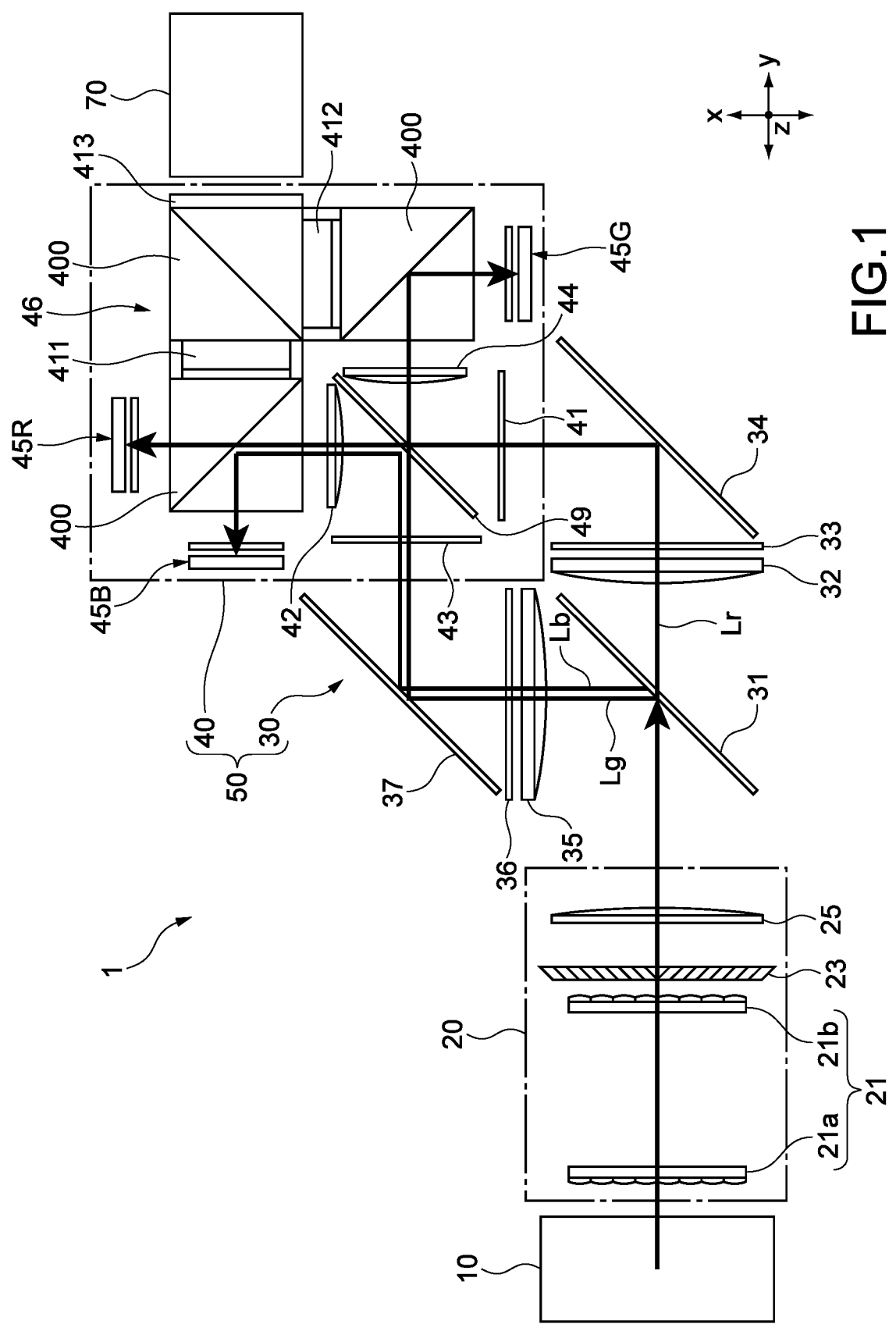
FIG. 1 is a diagram showing an optical system of a projector according to an embodiment of the present technology.

FIG. 1 is a diagram showing an optical system of a projector according to an embodiment of the present technology. A projector 1 includes a light source unit 10, a polarization-conversion unit 20, a separation-composite unit 50, and a projection unit 70.

1. 1) Light Source Unit

Although not shown, the light source unit 10 includes a laser light and a phosphor unit, for example, and produces a white light by using the laser light and the phosphor unit. The laser light source produces, for example, a laser having a peak wavelength of a luminescence intensity in 400 nm to 500 nm wavelength region, in other words, a blue laser light. The laser light functions as an excitation light that excites a phosphor layer provided in the phosphor unit.

The phosphor layer of the phosphor unit is excited by the excitation light from the laser light source to produce a fluorescence in a longer wavelength region than the wavelength of the excitation light. Thus, the fluorescence in a longer wavelength region than the wavelength of the excitation light excitation light is a fluorescence in a wavelength region of yellow including a mix of yellow and green and a mix of yellow and red. Moreover, the phosphor unit allows a part of the blue excitation light to pass therethrough to output a white light that has a mixed color of the blue light and the yellow fluorescence.

1. 2) Polarization-Conversion Unit

The polarization-conversion unit 20 includes an integrator element 21, a polarization-conversion element 23, a condenser lens 25, and the like, for example.

The integrator element 21 includes a pair of fly eye lenses 21a and 21b. The integrator element 21 outputs a plurality of parallel lights that have brightness unified by many micro-lenses which the fly eye lenses 21a and 21b include. The polarization-conversion element 23 has a function of converting one polarization (for example, p-polarization) included in an incident light from the integrator element 21 to the other polarization (for example, s-polarization) to unify the polarization. The light emitted from the polarization-conversion element 23 enters the separation-composite unit 50 via the condenser lens.

1. 3) Separation-Composite Unit

The separation-composite unit 50 includes a separation-optical-system unit 30 and a composite-optical-system unit 40.

The separation-optical-system unit 30 includes a dichroic mirror 31 provided on an incident side, two condenser lenses 32 and 35, two polarization filters 33 and 36, and two mirrors 34 and 37. In order to realize higher brightness of a projected image, the polarization filters 33 and 36 have a function of decreasing thermal loads of polarization elements 41 and 43 in the downstream. If it is not necessary to increase brightness, the polarization filters 33 and 36 are also not needed. For example, a wire grid, a ½ waveplate, and the like are used as structures of the polarization filters 33 and 36.

The dichroic mirror 31 allows a red (R) light Lr of lights emitted from the polarization-conversion unit 20 to pass therethrough, and reflects a green (G) light Lg and a blue (B) light Lb of the lights emitted from the polarization-conversion unit 20. The R light Lr enters the composite-optical-system unit 40 via the condenser lens 32, the polarization filter 33, and the mirror 34. Similarly, the G light Lg and the B light Lb enter the composite-optical-system unit 40 via the condenser lens 35, the polarization filter 36, and the mirror 37.

1. 4) Composite-Optical-System Unit 1. 4. 1) Entire Structure of Composite-Optical-System Unit The lights (each of the R, G, and B lights) having different wavelength regions separated by the separation-optical-system unit 30 enter the composite-optical-system unit 40, and the composite-optical-system unit 40 has a function of compositing image lights generated by image generation units 45R, 45G, and 45B respectively. For example, the composite-optical-system unit 40 includes the polarization filter 41, a dichroic mirror 49, field lenses 42 and 44, a core unit 46, and the image generation units 45R, 45G, and 45B for each of the R, G, and B lights.

For example, the polarization filter 41 includes a wire grid element, but not limited. The dichroic mirror allows the B light Lb to pass therethrough, and reflects the R light Lr and The G light Lg.

Figure 2:
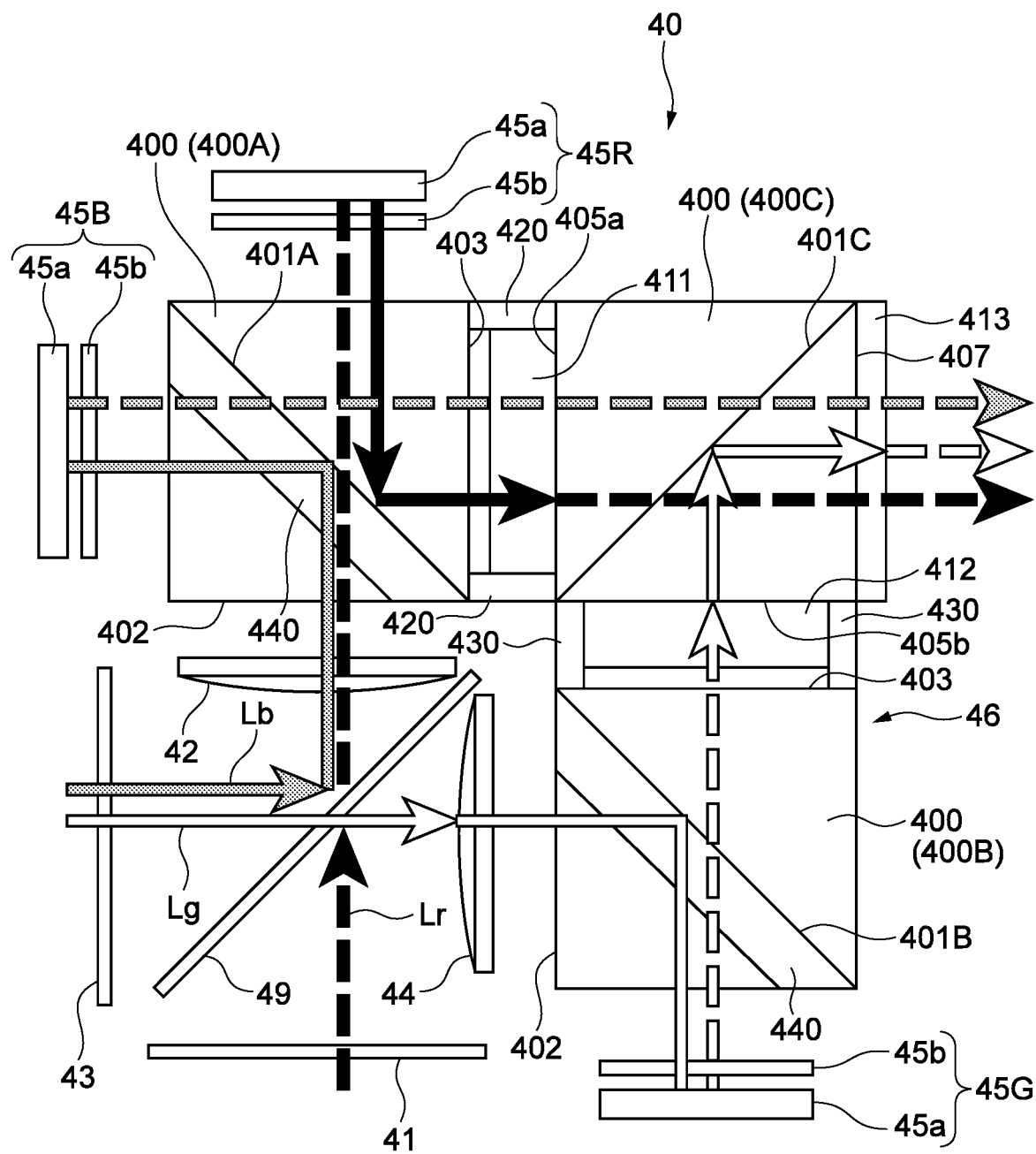
FIG. 2 shows a structure of the composite-optical-system unit of the optical system of FIG. 1.

FIG. 2 shows a structure of the composite-optical-system unit 40 of the optical system of FIG. 1. The core unit 46 includes a plurality of polarization beam splitters (PBSs) 400, and includes the three PBSs 400 in the present embodiment. The three PBSs 400 function as a first polarization beam splitter, a second polarization beam splitter, and a third polarization beam splitter respectively.

In a plan view (In FIG. 2, seen in the z-direction), for example, the three PBSs 400 are arranged in order that the respective polarization-separation films 401A, 401B, and 401C are in the T shape as a whole, and the entire core unit 46 is in the L shape.

For example, the core unit 46 includes two incident-side PBSs 400A and 400B, and one emission-side PBS 400C. The core unit 46 includes a pair of spacer plates 420 arranged between an emission-side surface 403 of the incident-side PBS 400A and an incident-side surface 405a of the emission-side PBS 400C. Furthermore, the core unit 46 includes a pair of spacer plates 430 arranged between the emission-side surface 403 of the incident-side PBS 400B and an incident-side surface 405b of the emission-side PBS 400C. Gaps are formed between the respective PBSs 400 by the pair of spacer plates 420 (430).

Wavelength-selective phase-difference elements 411 and 412 (optical elements) are arranged in the gaps respectively. The wavelength-selective phase-difference element 411 or 412 is also arranged on an emission-side surface 407 of the emission-side PBS 400C.

The field lenses 42 and 44 are arranged between incident-side surfaces 402 of the two incident-side PBSs 400A and 400B and the dichroic mirror 49 respectively.

Each of the image generation units 45R, 45G, and 45B includes an image generation element 45a that is reflective-type and an optical compensation element 45b. The image generation element 45a is a liquid-crystal device that is reflective-type, for example. The image generation element 45a is not limited to the liquid-crystal device, but may be a display element using a digital-micro-mirror. The image generation units 45R and 45B are arranged along two side surfaces (side surfaces other than the incident-side surface 402 and the emission-side surface 403) of the incident-side PBS 400A respectively. The image generation unit 45G is arranged along one side surface (side surface other than the incident-side surface 402 and the emission-side surface 403) of the incident-side PBS 400B. For example, a ¼ waveplate is used as the optical compensation element 45b.

A detailed structure of the core unit 46 will be described below.

P-polarized component of the R light Lr entering the incident-side PBS 400A passes through the polarization-separation film 401A, and enters the image generation unit 45R. The image generation unit 45R outputs an s-polarized red image light (R image light) on the basis of a received light, and returns the s-polarized R image light back to the incident-side PBS 400A. The returned s-polarized R image light is reflected by the polarization-separation film 401A, and enters the wavelength-selective phase-difference element 411.

S-polarized component of the B light Lb entering the incident-side PBS 400A is reflected by the polarization-separation film 401A, and enters the image generation unit 45B. The image generation unit 45B outputs a p-polarized blue image light (B image light) on the basis of the received light, and returns the p-polarized B image light back to the incident-side PBS 400A. The returned and p-polarized B image light passes through the polarization-separation film 401A, and enters the wavelength-selective phase-difference element 411.

S-polarized component of the G light Lg entering the incident-side PBS 400B is reflected by the polarization-separation film 401B, and enters the image generation unit 45G. The image generation unit 45G outputs a p-polarized green image light (G image light) on the basis of the received light, and returns the p-polarized G image light back to the incident-side PBS 400B. The returned and s-polarized G image light passes through the polarization-separation film 401B, and enters the wavelength-selective phase-difference element 412.

The polarized R image light is converted to a p-polarized light by the wavelength-selective phase-difference element 411, passes through the emission-side PBS 400C and a wavelength-selective phase-difference element 413, and enters the projection unit 70 (See FIG. 1). Moreover, the p-polarized B image light passes through the wavelength-selective phase-difference element 411, the emission-side PBS 400C, and the wavelength-selective phase-difference element 413, and enters the projection unit 70.

The p-polarized G image light is converted to an s-polarized light by the wavelength-selective phase-difference element 412, and reflected by the polarization-separation film 401C of the emission-side PBS 400C. Then, the G image light is converted to a p-polarized light by the wavelength-selective phase-difference element 413, and enters the projection unit 70.

The projection unit 70 mainly includes a projection lens that is not shown, and projects an incident light.

Figure 3:
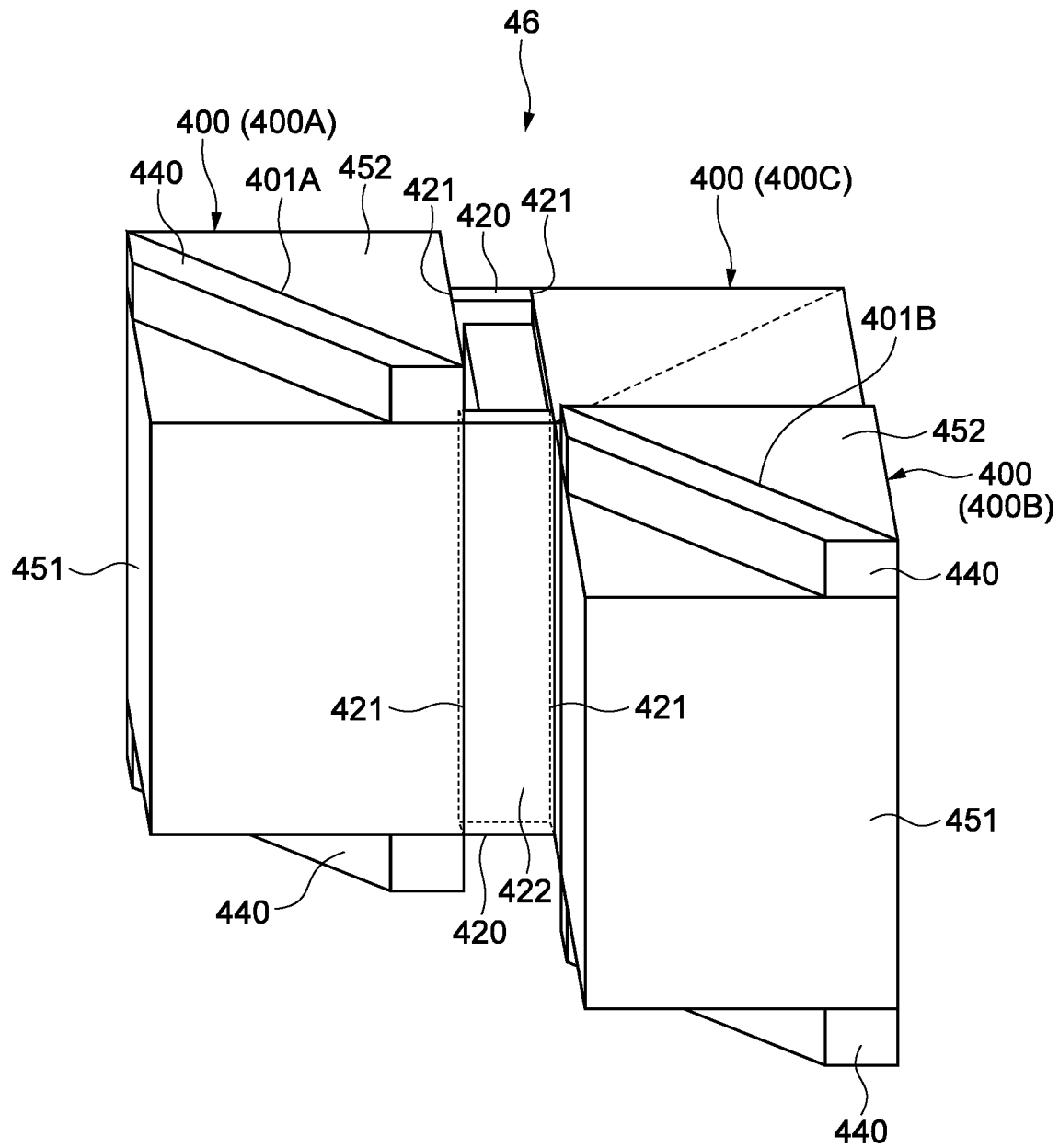
FIG. 3 is a perspective view showing the composite-optical-system unit (core unit).

FIG. 3 is a perspective view showing the composite-optical-system unit 40 (core unit 46). The three PBSs 400 are structured in the same rectangular parallelepiped shapes, for example. The pair of spacer plates 420 are structured in rectangular parallelepiped shapes respectively, and include a principal surface 422 and contact surfaces 421 (See FIG. 2). The contact surfaces 421 contact with the emission-side surface 403 of the PBS 400A and the incident-side surface 405a of the emission-side PBS 400C, and are fixed on the emission-side surface 403 of the PBS 400A and the incident-side surface 405a of the emission-side PBS 400C by an adhesive. As a result, the pair of spacer plates 420 are fixed on the two PBSs 400A and 400C.

An area of the contact surface 421 is designed to be smaller than an area of the principal surface 422. However, the area of the principal surface may be designed to be smaller than the area of the contact surface.

As shown in FIG. 2, the pair of spacer plates 430 that are adhered and fixed between the incident-side PBS 400B (emission-side surface 403) and the emission-side PBS 400C (incident-side surface 405b) have the similar structures to the structures of the pair of spacer plates 420.

The spacer plates 420 (430) that are structured in plate shapes make a pair, and are arranged in order that the emission-side surface 403 of the incident-side PBS 400A (400B) and the incident-side surface 405a (405b) of the emission-side PBS 400C contact with the contact surfaces 421 (431) of the spacer plates 420 (430) by on-plane contact. By such a structure, a stiffness of the composite-optical-system unit 40 may be increased. Due to this, relative position accuracy of the PBSs 400 (polarization-separation films) may be maintained accurately, and a desired optical property may be maintained.

Particularly, in the present embodiment, lengths of the spacer plates 420 (430) in a length direction (z-direction) are the same as lengths of the PBSs 400 in the same direction substantially. Due to this, relatively, tilting of the two PBSs 400 that are on either end of the pair of spacer plates 420 (430) relatively from the z-axis may be suppressed effectively.

Moreover, according to the present embodiment, a simple structure including the pair of spacer plates 420 (430) may realize the composite-optical-system unit 40 having a high stiffness.

The spacer plates 420 and 430 are composed of glass that is the same or similar to a material of the prisms of the PBSs 400. Due to this, thermal expansion of the spacer plates 420 and 430 may be suppressed to be smaller. Moreover, coefficients of thermal expansion of the spacer plates 420 and 430, and the PBSs 400 may be the same or similar to each other, and as a result, production of a distortion of the composite-optical-system unit 40 may be suppressed.

1. 4. 2) Structures of Incident-Side PBS and Thermal Conduction Member

Figure 4:
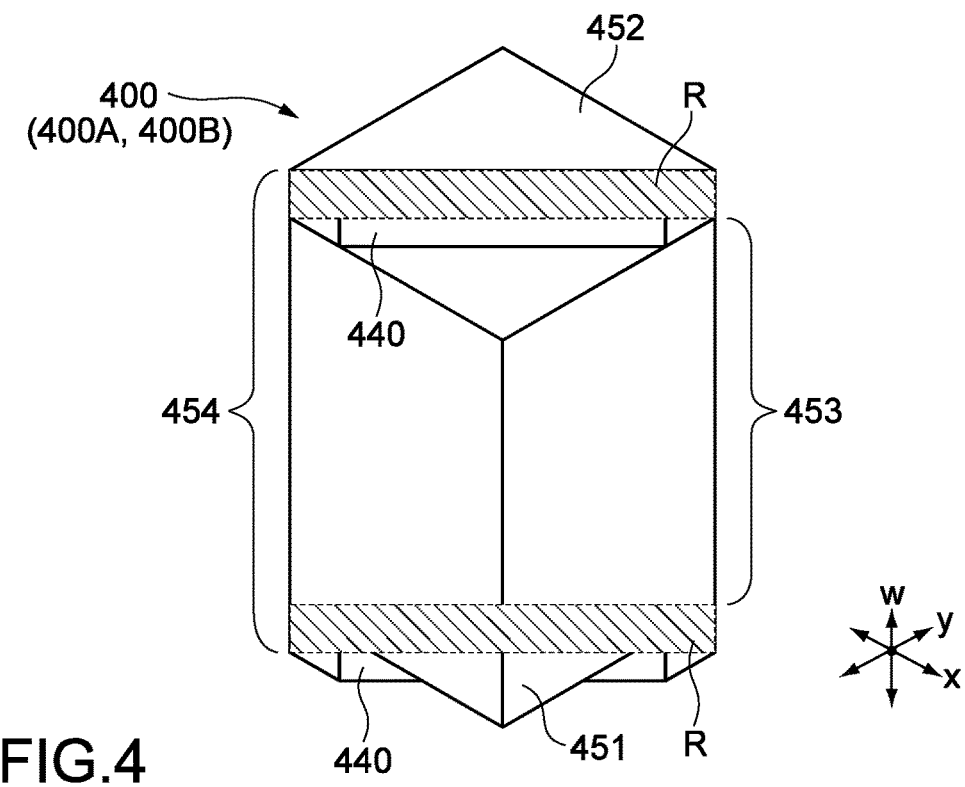
FIG. 4 is a perspective view showing a PBS and thermal conduction members that are connected to the PBS.

The incident-side PBS 400B has the similar structure to the structure of the incident-side PBS 400A. Here, the incident-side PBS 400A will be described. And hereinafter, the incident-side PBS 400A will be simply described as "PBS 400". FIG. 4 is a perspective view showing the PBS 400 and thermal conduction members that are connected to the PBS 400. Note that, in FIG. 1, the thermal conduction members 440 are not shown.

The PBS 400 has a first prism 451, and a second prism 452 that has a different length from a length of the first prism 451 in the z-direction. The first prism 451 and the second prism 452 are right-triangle prisms. For example, an area of a first surface 453 of the first prism 451 facing the second prism 452 is different from an area of a second surface 454 of the second prism 452 facing the first surface 453. Specifically, the area of the second surface 454 is formed to be larger than the area of the first surface 453.

Here, for the sake of description, a 45° axis between the x-axis and the y-axis on the x-y plane is referred to as w-axis.

Figure 5:
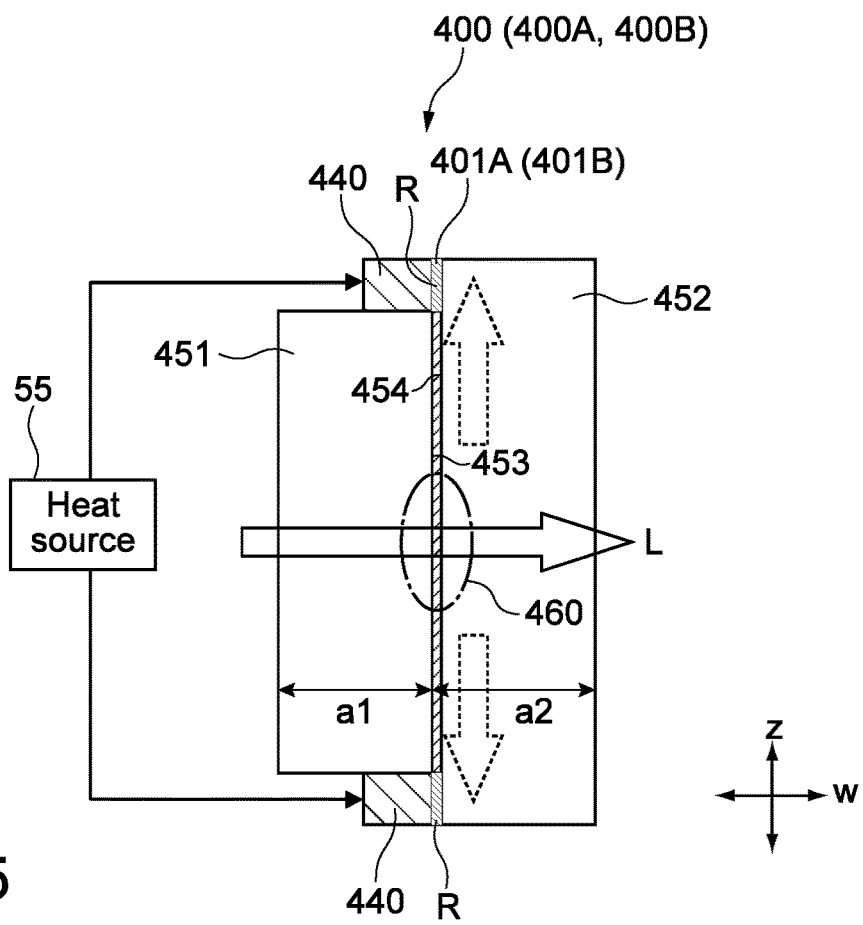
FIG. 5 is a cross-sectional view showing the PBS in the w-axis direction.

FIG. 5 is a cross-sectional view showing the PBS 400 in the w-axis direction. As shown in FIG. 5, a width a1 of the first prism 451 and a width a2 of the second prism 452 along the first surface 453 and the second surface 454 in the w-direction are designed to be the same substantially. The first surface 453 or the second surface 454 is a surface on which the polarization-separation film 401A is provided. In the present embodiment, the polarization-separation film 401A having the same area as an area of the second surface 454 is provided. For example, the polarization-separation film 401A is composed of one layer or a plurality of layers, and the materials thereof are mainly composed of metal.

The PBS 400 includes an overlap interface on which the first surface 453 is attached to and overlaps the second surface 454. In the present embodiment, the overlap interface has the same area as the area of the first surface 454. For the sake of description, surface regions other than the overlap interface on the second surface 454 are called "connection regions", and a reference symbol thereof is R. Thus, the PBS 400 is structured by attaching the first prism 451 to the second prism 452 in order that the connection regions R are arranged on at least a part of regions surrounding the overlap interface, in the present embodiment, both the ends of the second surface 454 in the z-direction. In FIG. 4, the connection regions R are regions shown by hatching.

Note that the first prism 451 is structured to have the same size as a size of each of two prisms included in the emission-side PBS 400C.

The thermal conduction members 440 are thermally connected to the entire connection regions R. For example, the thermal conduction members 440 are connected to the connection regions R directly, or via thermal conductive grease or the like that is not shown. The thermal conduction members 440 have substantially rectangular parallelepiped shapes, but not particularly limited. For example, a metal material that has a high thermal conductivity such as aluminum or copper is used as the thermal conduction members 440. The thermal conduction members 440 are structured in solid or hollow structures.

Each of horizontal widths (widths in directions parallel to the x-y plane) of the thermal conduction members 440 is structured to be the same as each of horizontal widths of the connection regions R, and each of thicknesses (thicknesses in the z-direction) of the thermal conduction members 440 is structured to be the same as each of vertical widths (widths in the z-direction) of the connection regions R. However, each measurement of the thermal conduction members 440 is not limited to this, and may be larger than each of the horizontal widths or each of the vertical widths of the connection regions R.

As shown in FIG. 5, a heat source 55 is thermally connected to the thermal conduction members 440. The heat source 55 is a heater such as a heating-wire heater or a thermoelectric element, for example. Here, in a case that the thermal conduction members 440 are the thermoelectric elements, heat radiation sides may be thermally connected to the connection regions R. Alternatively, the heat source 55 may be a device producing heat and provided in the projector 1. Examples of the device producing the heat include an IC chip (for example, CPU (Central Processing Unit) or graphic chip) that is not shown, and the image generation units 45R, 45G, and 45B described above, for example. The heat is transmitted from the devices producing the heat to the thermal conduction members 440 via, for example, another thermal conduction medium.

As shown in FIG. 5, a light L traveling in the PBS 400 includes a light traveling from the first prism 451 through the second prism 452 (See FIG. 2). In this case, an intensity distribution of the light has the highest intensity in a center region 460 of the PBS 400. Thus, without taking a measure such as providing the thermal conduction members 440, a temperature in the center region 460 of the PBS 400 is the highest. The main material of the prisms is glass, and the thermal conductivity thereof is low. Thus, the closer to a region of each end of the first prism 451 and the second prism 452, the lower the temperature thereof, and the larger a difference between the temperature in the center region 460 of the PBS 400 and the temperature of each end of the first prism 451 and the second prism 452. In such a situation, a crack may be produced in the center region 460 of the PBS 400.

According to the present embodiment, the heat is transmitted from the heat source 55 via the thermal conduction members 440 to the entire polarization-separation film 401A having a relatively high thermal conductivity. Due to this, it is possible to make the heat of the first prism 451 and the second prism 452 uniform in the z-direction, and contribute to making the heat of the entire PBS 400 uniform. Thus, the core unit 46 may suppress production of a sharp temperature gradient of the PBS 400. As a result, production of the crack in the center region 460 of the PBS 400 may be suppressed.

2. Examples of Composite-Optical-System Unit Including Thermal Conduction Member According to Other Embodiments Next, composite-optical-system units including thermal conduction members according to other embodiments of the present technology will be described. Hereinafter, the same reference symbols are attached to the substantially similar elements as the members, the functions, and the like of the composite-optical-system unit 40 or the core unit 46 according to the first embodiment and the like. Besides, the descriptions of those are omitted or simplified, and different points are mainly described.

2. 1) Example 1

Figure 6:
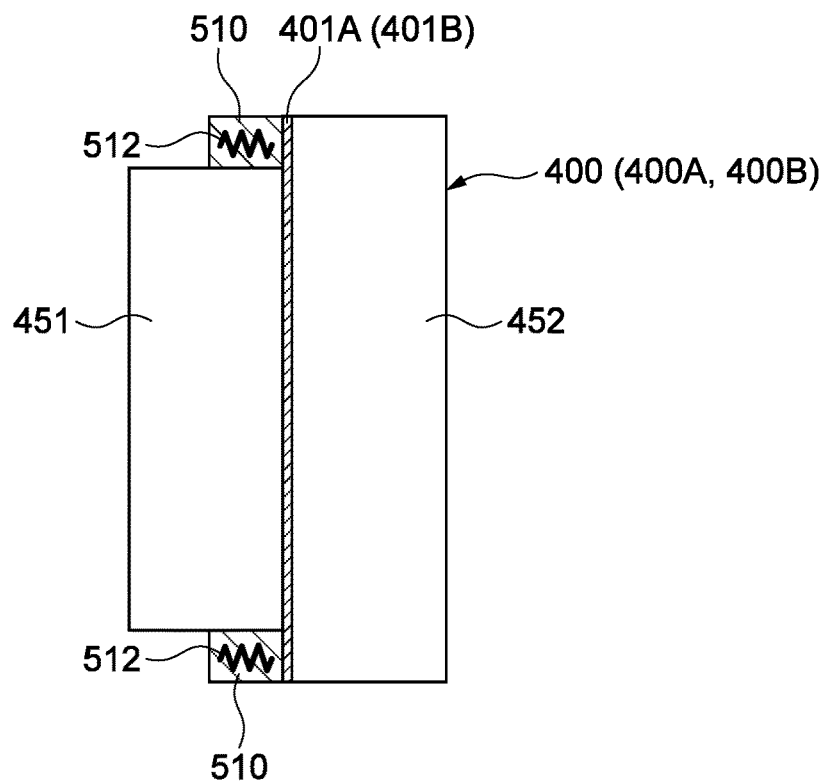
FIG. 6 is a side view showing thermal conduction members and a PBS according to another example.

Thermal conduction members 510 according to an example of FIG. 6 are heaters including built-in heating wires 512, for example. The heaters may be adjustable for a temperature. Due to this, similarly to the embodiment, it is possible to make heat of the first prism 451 and the second prism 452 uniform in the z-direction by the heat supplied from the thermal conduction members 510, and contribute to making the heat of the entire PBS 400 uniform.

2. 2) Example 2

Figure 7:
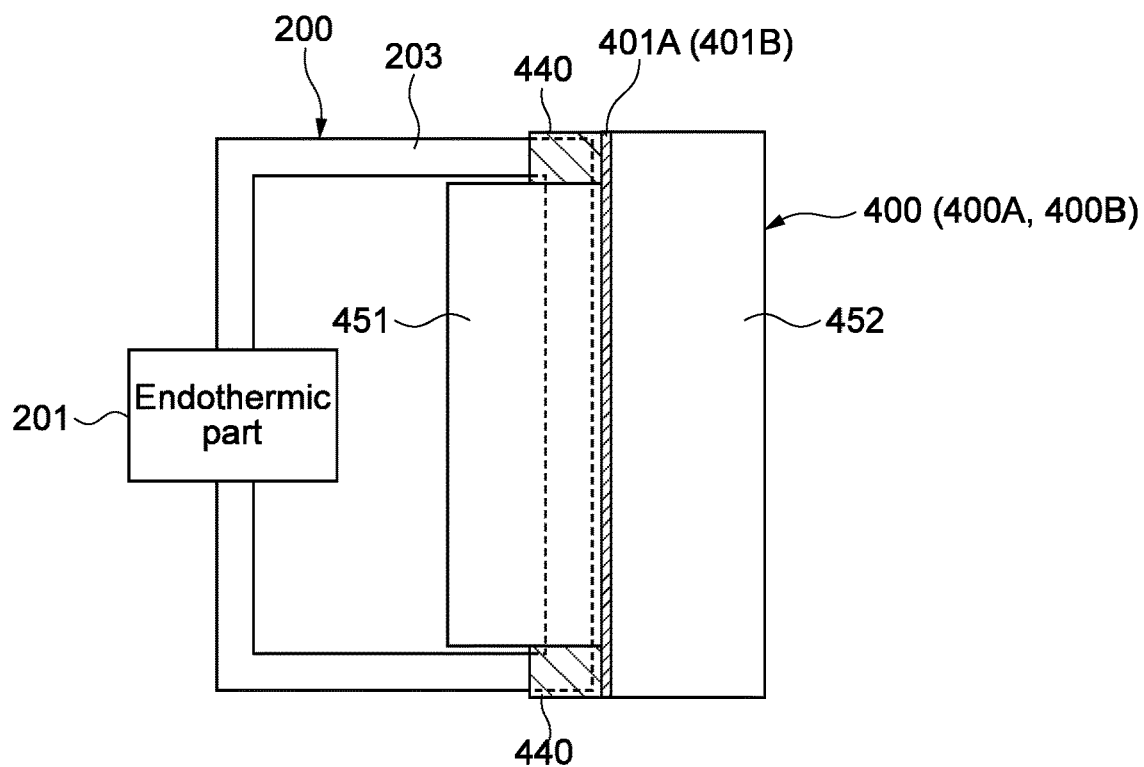
FIG. 7 shows the thermal conduction members and a PBS according to still another example.

According to an example of FIG. 7, similarly to the embodiment of FIG. 5, a metal material having a high thermal conductivity is used as the thermal conduction members 440. The thermal conduction members 440 are connected to a heat transport device 200 such as a heat pipe. The heat transport device 200 includes an endothermic part 201, and a tube 203 that is thermally connected to the thermal conduction members 440 and circulates a working medium. As described above, the endothermic part 201 is thermally connected to the device producing heat and provided in the projector 1. The tube 203 is arranged on an arbitrary position in the first prism 451 in order that the tube 203 does not interfere with the PBS 400. The thermal conduction members 440 are connected to positions far from the endothermic part 201, and have a function as a heat radiation part.

According to such a structure, the heat may be supplied from the thermal conduction members 440 to the PBS 400 via the connection regions R.

2. 3) Example 3

Figure 8:
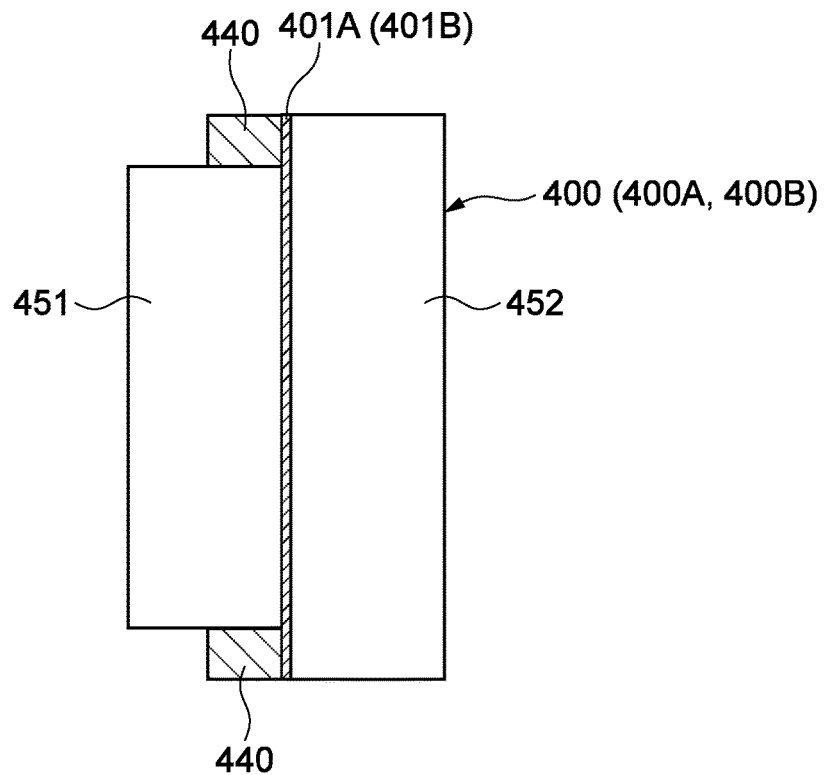
FIG. 8 shows the thermal conduction members and a PBS according to still another example.

The thermal conduction members 440 are not limited to having only a function of supplying heat to the PBS 400, but may have a function of absorbing or radiating heat. FIG. 8 shows an example of the thermal conduction members 440. According to the example of FIG. 8, similarly to the embodiment of FIG. 5, a metal material that has a high thermal conductivity such as aluminum or copper is used as the thermal conduction members 440 for example. The example is an embodiment in which the heat source 55 is removed from the embodiment of FIG. 5.

According to such a structure, heat produced in a center region of the PBS 400 is diffused mainly via the polarization-separation film 401A, and released via the thermal conduction members 440 to an exterior of the PBS 400. Thus, the thermal conduction members 440 function as a heat radiation member or a heat sink. Due to this, a peak temperature of the center region of the PBS 400 may be lowered, and in other words, rise of the temperature of the PBS 400 may be suppressed.

Instead of the thermal conduction members 440, a thermoelectric element, here, a Peltier device cooling connection regions, may be provided.

2. 4) Example 4

Figure 9:
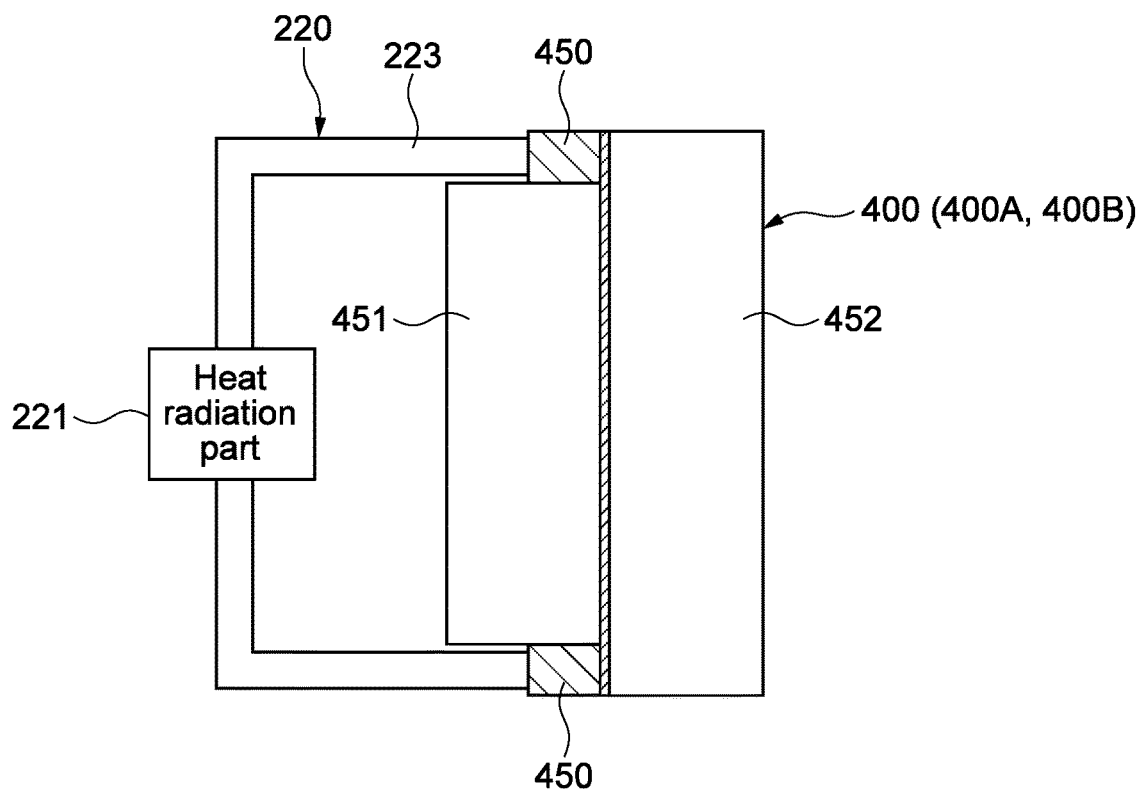
FIG. 9 shows thermal conduction members and a PBS according to still another example.

FIG. 9 shows another example of thermal conduction members having a function of absorbing heat. In the example, a heat transport device 220 having a heat radiation part 221 and a tube 223 is connected to thermal conduction members 450. The thermal conduction members 450 have a function as an endothermic part as a part of the heat transport device 220, or are metal members having high thermal conductivities and thermally connected to the endothermic part.

3. Examples of Other Shapes and/or Arrangements of Thermal Conduction Member Next, examples of other shapes and/or arrangements of thermal conduction members will be described.

3. 1) Example 1

Figure 10:
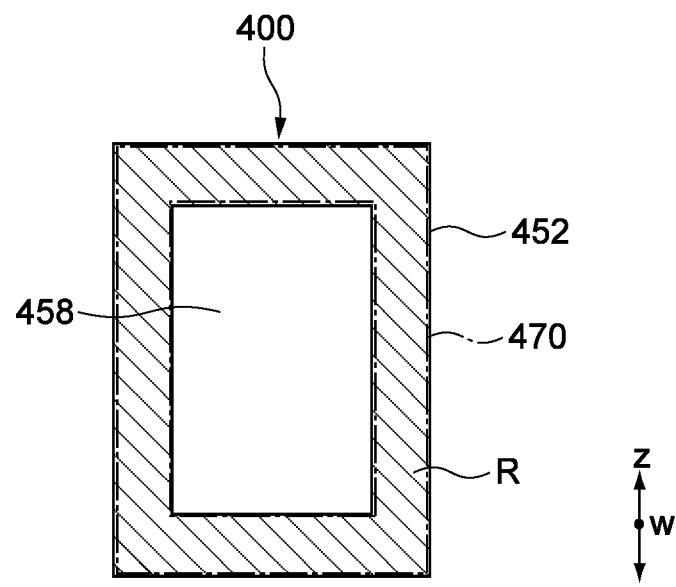
FIG. 10 shows a thermal conduction member and a PBS according to still another example.

FIG. 10 shows an example of other shape and the like of a thermal conduction member. A Length of a first prism 458 of the PBS 400 in the z-direction (long side direction) and a width of the first prism 458 in a direction (short side direction) orthogonal to the z-direction are formed to be shorter than those of the second prism 452. In other words, the connection region R is provided on the entire region surrounding an overlap interface of the first prism 458 and the second prism 452. A thermal conduction member 470 is thermally connected to the entire connection region R. As a result, the larger a volume or a surface area of the thermal conduction member 470, the higher a thermal-conduction efficiency.

3. 2) Example 2

Figure 11:
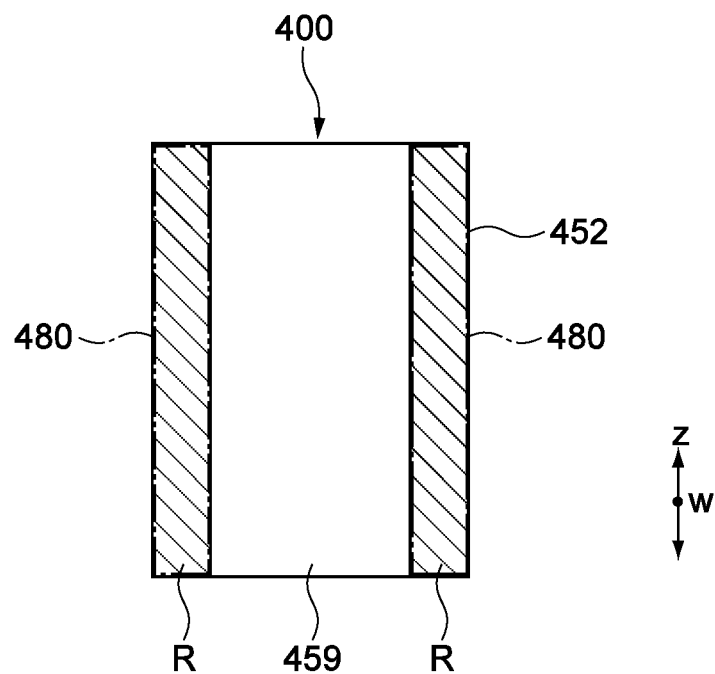
FIG. 11 shows thermal conduction members and a PBS according to still another example.

According to an example of FIG. 11, a length of a first prism 459 in the z-direction (long side directions) is the same substantially as that of the second prism 452. However, a length of the first prism 459 in a direction (short side direction) orthogonal to the z-direction is formed to be shorter than that of the second prism 452. In other words, the connection regions R are provided on both ends in the short side direction of an overlap interface of the first prism 459 and the second prism 452. Thermal conduction members 480 are thermally connected to the connection regions R.

The example of FIG. 10 or FIG. 11 described above may be combined to any one example of FIGS. 5 to 9.

4. Various Other Embodiments

The present technology is not limited to the embodiment described above, and the present technology may realize various other embodiments.

As described above, the one prism of the two prisms (the first prism and the second prism) included in the incident-side PBS 400A (400B) to which the pair of spacer plates 420 are connected is structured to be larger than the other prism. However, the one prism to which the pair of spacer plates 420 are connected may be formed to be smaller than the other prism.

According to the above respective embodiments, the thermal conduction members 440 are connected to the entire connection regions R. However, the thermal conduction members 440 may be connected to parts of the connection regions R.

According to the above respective embodiments, the connection regions R are provided in regions symmetric about a center line of the overlap interface. However, the connection regions R may be provided in regions point-symmetric, rotational symmetric, or asymmetric about a center point of the overlap interface.

A thermal conduction member may be connected to only the one of the two incident-side PBSs 400A and 400B. In this case, the other PBS 400 may have two prisms having the same size like the emission-side PBS 400C.

The embodiments of the thermal conduction members of FIGS. 5 to 11 are also applicable to the emission-side PBS 400C.

At least two of the features of the other embodiments described above may also be combined.

Note that the present technology may also employ the following configurations.

(1)
A composite-optical-system unit, including:
a polarization beam splitter that includes a first prism including a first surface, a second prism including a second surface having an area different from an area of the first surface, and an overlap interface on which the first surface is attached to and overlaps the second surface; and
a thermal conduction member that is thermally connected to a connection region being a region other than the overlap interface of the first surface or the second surface having an area larger than an area of the other surface.

(2)
The composite-optical-system unit according to (1), further including
a heat source that supplies heat to the polarization beam splitter via the thermal conduction member.

(3)
The composite-optical-system unit according to (1), in which
the thermal conduction member includes a heater that supplies heat to the polarization beam splitter.

(4)
The composite-optical-system unit according to any one of (1) to (3), in which
the first prism and the second prism are attached to each other in order that the connection region is provided in at least a part of a region around the overlap interface.

(5)
The composite-optical-system unit according to (4), in which
the connection region is provided on both ends of the first surface or the second surface to be on either end of the overlap interface.

(6)
The composite-optical-system unit according to (4), in which
the connection region is provided on an entire region surrounding the overlap interface.

(7)
The composite-optical-system unit according to any one of (1) to (6), in which
the thermal conduction member is a heat sink, a part of a heat transport device, or a thermoelectric element.

(8)
The composite-optical-system unit according to any one of (1) to (7), in which
the plurality of polarization beam splitters are provided, and
each of the plurality of polarization beam splitters includes an incident-side surface that a light enters and an emission-side surface from which a light is emitted,
the composite-optical-system unit according to any one of (1) to (7), further including:
a pair of spacer plates, each of the pair of spacer plates including a first contact surface and a second contact surface provided on a side opposite to the first contact surface, each of the pair of spacer plates being arranged between a first polarization beam splitter and a second polarization beam splitter of the plurality of polarization beam splitters in order that the first contact surface is fixed on the emission-side surface of the first polarization beam splitter by on-plane contact, and the second contact surface is fixed on the incident-side surface of the second polarization beam splitter by on-plane contact; and
an optical element arranged between the pair of spacer plates.

(9)
A projector, including:
a light source unit;
a separation optical system that separates a light emitted from the light source unit into lights having different wavelength regions;
image generation elements that generate image lights using the lights having the different wavelength regions respectively; and
a composite-optical-system unit, the lights having the different wavelength regions separated by the separation optical system entering the composite-optical-system unit, the composite-optical-system unit being configured to composite the image lights generated by the image generation elements respectively,
the composite-optical-system unit including
a polarization beam splitter that includes a first prism including a first surface, a second prism including a second surface having an area different from an area of the first surface, and an overlap interface on which the first surface is attached to and overlaps the second surface, and
a thermal conduction member that is thermally connected to a connection region being a region other than the overlap interface of the first surface or the second surface having an area larger than an area of the other surface.

REFERENCE SIGNS LIST

1 projector
10 light source unit
30 separation-optical-system unit
40 composite-optical-system unit
45R, 45G, 45B image generation unit
45a image generation element
45b optical compensation element
55 heat source
200, 220 heat transport device 400 PBS
400A, 400B incident-side PBS
400C emission-side PBS
401A, 401B, 401C polarization-separation film
402, 405a, 405b incident-side surface
403 emission-side surface
411, 412 wavelength-selective phase-difference element
420, 430 spacer plate
421, 431 contact surface
440, 450, 470, 480, 510 thermal conduction member
451, 458, 459 first prism
452 second prism
453 first surface
454 second surface

The invention claimed is:

1. A composite-optical-system unit, comprising:
a polarization beam splitter that includes a first prism including a first surface, a second prism including a second surface having an area different from an area of the first surface, and an overlap interface on which the first surface is attached to and overlaps the second surface; and
a thermal conduction member that is thermally connected to a connection region, the connection region being a region other than the overlap interface of the first surface and the second surface,
wherein an entirety of the overlap interface on which the first surface is attached to the second surface is formed along a single plane, and an entirety of the connection region is formed along the single plane,
wherein each of the overlap interface and the connection region are provided along the second surface that faces in a direction of the first surface, and
wherein the area of the second surface is larger than the area of the first surface.

2. The composite-optical-system unit according to claim 1, further comprising
a heat source that supplies heat to the polarization beam splitter via the thermal conduction member.

3. The composite-optical-system unit according to claim 1, wherein
the thermal conduction member includes a heater that supplies heat to the polarization beam splitter.

4. The composite-optical-system unit according to claim 1, wherein
the first prism and the second prism are attached to each other in order that the connection region is provided in at least a part of a region around the overlap interface.

5. The composite-optical-system unit according to claim 4, wherein
the connection region is provided on both ends of the first surface or the second surface to be on either end of the overlap interface along the single plane.

6. The composite-optical-system unit according to claim 4, wherein
the connection region is provided on an entire region surrounding the overlap interface.

7. The composite-optical-system unit according to claim 1, wherein
the thermal conduction member is a heat sink, a part of a heat transport device, or a thermoelectric element.

8. The composite-optical-system unit according to claim 1, wherein
a plurality of polarization beam splitters are provided, and each of the plurality of polarization beam splitters includes an incident-side surface that a light enters and an emission-side surface from which a light is emitted,
the composite-optical-system unit according to claim 1, further comprising:
a pair of spacer plates, each of the pair of spacer plates including a first contact surface and a second contact surface provided on a side opposite to the first contact surface, each of the pair of spacer plates being arranged between a first polarization beam splitter and a second polarization beam splitter of the plurality of polarization beam splitters in order that the first contact surface is fixed on the emission-side surface of the first polarization beam splitter by on-plane contact, and the second contact surface is fixed on the incident-side surface of the second polarization beam splitter by on-plane contact; and
an optical element arranged between the pair of spacer plates.

9. A projector, comprising:
a light source unit;
a separation optical system that separates a light emitted from the light source unit into lights having different wavelength regions;
image generation elements that generate image lights using the lights having the different wavelength regions respectively; and
a composite-optical-system unit, the lights having the different wavelength regions separated by the separation optical system entering the composite-optical-system unit, the composite-optical-system unit being configured to composite the image lights generated by the image generation elements respectively,
the composite-optical-system unit including
a polarization beam splitter that includes a first prism including a first surface, a second prism including a second surface having an area different from an area of the first surface, and an overlap interface on which the first surface is attached to and overlaps the second surface, and
a thermal conduction member that is thermally connected to a connection region, the connection region being a region other than the overlap interface of the first surface and the second surface,
wherein an entirety of the overlap interface where the first surface is attached to the second surface is formed along a single plane, and an entirety of the connection region is formed along the single plane,
wherein each of the overlap interface and the connection region are provided along the second surface that faces in a direction of the first surface, and
wherein the area of the second surface is larger than the area of the first surface.

* * * * *